(12) United States Patent
Grewal et al.

(10) Patent No.: US 7,613,329 B2
(45) Date of Patent: Nov. 3, 2009

(54) APPARATUS FOR CONTROLLING THE POSITION OF A SCREEN POINTER THAT DETECTS DEFECTIVE PIXELS

(75) Inventors: Roopinder Singh Grewal, San Jose, CA (US); Ramakrishna Kakarala, Santa Clara, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1051 days.

(21) Appl. No.: 10/795,688

(22) Filed: Mar. 8, 2004

(65) Prior Publication Data

US 2005/0195163 A1    Sep. 8, 2005

(51) Int. Cl.
*G06K 9/00* (2006.01)
*G06F 3/033* (2006.01)
*G06F 3/042* (2006.01)
*G09G 3/28* (2006.01)

(52) U.S. Cl. .................. 382/107; 382/103; 345/157; 345/163; 345/167; 345/175; 345/182

(58) Field of Classification Search .................. 345/157, 345/166, 163, 182, 207, 167, 175, 156; 382/107, 382/103
See application file for complete search history.

(56) References Cited

U.S. PATENT DOCUMENTS

| | | |
|---|---|---|
| 4,409,479 A | 10/1983 | Sprague et al. |
| 4,794,384 A | 12/1988 | Jackson |
| 4,920,260 A | 4/1990 | Victor et al. |
| 5,248,873 A | 9/1993 | Allen et al. |
| 5,578,813 A | 11/1996 | Allen et al. |
| 5,578,817 A | 11/1996 | Bidiville |
| 5,644,139 A | 7/1997 | Allen et al. |
| 5,703,356 A | 12/1997 | Bidiville et al. |
| 5,748,872 A | 5/1998 | Norman |
| 5,786,804 A | 7/1998 | Gordon |
| 5,854,482 A | 12/1998 | Bidiville et al. |
| 5,965,879 A | 10/1999 | Leviton |
| 6,084,574 A | 7/2000 | Bidiville et al. |
| 6,093,923 A | 7/2000 | Vock et al. |
| 6,124,587 A | 9/2000 | Bidiville et al. |
| 6,218,659 B1 | 4/2001 | Bidiville et al. |
| 6,256,016 B1 * | 7/2001 | Piot et al. .................. 345/166 |

(Continued)

FOREIGN PATENT DOCUMENTS

JP     05115040     5/1993

(Continued)

OTHER PUBLICATIONS

Ramakrishna Kakarala et al. patent application entitled "Method for Detecting and Correcting Defective Pixels in a Digital Image Sensor" filed Sep. 18, 2002; 57 pgs.

(Continued)

*Primary Examiner*—Bhavesh M Mehta
*Assistant Examiner*—Bernard Krasnic

(57) ABSTRACT

An apparatus for controlling the position of a screen pointer includes a light source for illuminating an imaging surface, thereby generating reflected images. The apparatus includes a navigation sensor for generating digital images based on the reflected images, detecting defective pixel locations in the digital images, and generating movement data based on the digital images that is indicative of relative motion between the imaging surface and the apparatus.

11 Claims, 4 Drawing Sheets

U.S. PATENT DOCUMENTS

| | | | |
|---|---|---|---|
| 6,281,882 B1 | 8/2001 | Gordon et al. | |
| 6,320,173 B1 | 11/2001 | Vock et al. | |
| 6,509,889 B2* | 1/2003 | Kamper et al. | 345/157 |
| 6,529,622 B1* | 3/2003 | Pourjavid | 382/149 |
| 6,603,111 B2 | 8/2003 | Dietz et al. | |
| 6,657,184 B2 | 12/2003 | Anderson et al. | |
| 6,770,863 B2 | 8/2004 | Walley | |
| 6,823,077 B2 | 11/2004 | Dietz et al. | |
| 7,009,644 B1 | 3/2006 | Sanchez | |
| 7,071,922 B2 | 7/2006 | Sun et al. | |
| 7,127,737 B1 | 10/2006 | Bayrakeri et al. | |
| 7,176,432 B2 | 2/2007 | Komiya | |
| 2002/0101587 A1* | 8/2002 | Wilson et al. | 356/328 |
| 2002/0180880 A1 | 12/2002 | Bean et al. | |
| 2003/0001078 A1 | 1/2003 | Baharav et al. | |
| 2003/0103037 A1 | 6/2003 | Rotzoll | |
| 2003/0146975 A1* | 8/2003 | Joung et al. | 348/164 |
| 2004/0051798 A1* | 3/2004 | Kakarala et al. | 348/246 |
| 2004/0246232 A1 | 12/2004 | Chang et al. | |
| 2005/0024336 A1 | 2/2005 | Xie et al. | |
| 2005/0083303 A1 | 4/2005 | Schroeder et al. | |
| 2005/0195163 A1 | 9/2005 | Grewal et al. | |
| 2005/0206614 A1* | 9/2005 | Brosnan et al. | 345/156 |
| 2005/0283307 A1 | 12/2005 | Siah et al. | |
| 2006/0044267 A1* | 3/2006 | Xie et al. | 345/157 |

FOREIGN PATENT DOCUMENTS

| | | |
|---|---|---|
| WO | WO-00/38103 | 6/2000 |

OTHER PUBLICATIONS

Yoshida, A. "Optical Computing Techniques for Image/Video Compression", *Proceedings of the IEEE* vol. 82, Issue 6, Digital Object Identifier 10.1109/5.286198., (Jun. 1994),948-954.

Berra, P. B. "Optics and Supercomputing", *Proceedings of the IEEE* vol. 77, Issue 12, Digital Object Identifier 10.1109/5.48824, (Dec. 1989),1797-1815.

Nirmaier, T et al., "High Speed CMOS Wavefront Sensor with Resistive Ring Networks of Winner Take All Circuits", *Solid state Circuits, IEEE Journal of* vol. 40, Issue 11, Digital Object Identifier 10.1109/JSSC.2005.857350., (Nov. 2005),2315-2322.

Chu, P.L. et al., "Optimal Projection for Multidimensional Signal Detection", *Acoustics, Speech, and Signal Processing (see also IEEE Transaction on Signal Processing), IEEE Transactions on*, vol. 36, Issue 5, Digital Object Identifier 10.1109/29.1587., (May 1988),775-786.

Downs, J et al., "An Improved Video-Based Computer Tracking System for Soft Biomaterials Testing", *Biomedical Ingineering, IEEE Transaction on*, vol. 37, Issue 9, Digital Object Identifier 10.1109/10.58600, (1990),903-907.

Williamson, I.C. et al., "Source Width Insensitive Optical Position Sensor", *Instumentation and Measurement, IEEE Transactions on* vol. 43, Issue 6, (Dec. 1994),848-856.

Tartagni, M et al., "A Photodiode Cell for Applications to Position and Motion Estimation Sensors", *Industrial Electronics, IEEE Transactions on*, vol. 43, Issue 1, Digital Object Identifier 10.1109/41.481426., (Feb. 1996),200-206.

Miller, M.I. et al., "Automatic Target Recongnition Organized Via Jump-Diffusions Algorithms", *Image Processing, IEEE Transactions on*, vol. 6, Issue 1, Digital Object Identifier 10.1109/83.552104, vol. 6, Issue 1,(1997),157-174.

Scheffer, D. et al., "Random Addressable 2048x2048 Active Pixel Image Sensor", *Electron Devices, IEEE Transactions on*, vol. 44, Issue 10, Digital Object Identifier 10.1109/16.628827., (1997),1716-1720.

Clapp, M.A. et al., "A Dual Pixel Type Array for Imaging and Motion Centroid Localization", *Sensor Journal, IEEE*, vol. 2, Issue 6, Digital Object Identifier 10.1109/JSEN.2002.806894., (Dec. 2002),529-548.

Weisenberger, A.G. et al., "A Restraint Free Small Animal SPECT Imaging System with Motion Tracking", *Nuclear Science, IEEE Transactions on* vol. 52, Issue 3, Part 1, vol. 52, Issue 3 Part 1,(Jun. 2005),638-644.

Burns, R.D. "Object Location and Centroiding Techniques with CMOS Active Pixel Sensors", *Electron Devices, IEEE Transactions on*, vol. 50 Issue 12, Digital Object Identifier 10.1109/TED.2003.819260., (Dec. 2003),2369-2377.

Higgins, C.M. et al., "A Biologically Inspired Modular VLSI System for Visual Measurement of Self-Motion", *Sensor Journal, IEEE*, vol. 2 Issue 6, Digital Object Identifier 10.1109/JSEN.2002./807304., (Dec. 2002),508-528.

Honghao, Ji et al., "CMOS Contact Imager for Monitoring Cultured Cell", *Circuits and Systems*, 2005. ISCAS 2005. *IEEE International Symposium*, vol. 4, Digital Object Identifier 10.1109/ISCAS.2005.1465381., (May 23-26, 2005),3491-3494.

Svelto, Orazio "Principles of Lasers", (1998, 1989, 1982, 1976),9-10.

Lucas, Bruce D., et al., "An Iterative Registration Technique with an Application to Stereo Vision", (Aug. 24-28, 1981),674-679.

Chen, Yang, "Highway Overhead Structure Detection Using Video Image Sequences", *Intelligent Transportation Systems, IEEE Transactions on* vol. 4, Issue 2, Digital Object Identifier 10.1109/TITS.2003.821209. Jun. 2003, 67-77.

\* cited by examiner

APPARATUS FOR CONTROLLING THE POSITION OF A SCREEN POINTER THAT DETECTS DEFECTIVE PIXELS

THE FIELD OF THE INVENTION

This invention relates generally to devices for controlling a pointer on a display screen, and relates more particularly to an apparatus for controlling the position of a screen pointer that detects defective pixels.

BACKGROUND OF THE INVENTION

The use of a hand operated pointing device for use with a computer and its display has become almost universal. One form of the various types of pointing devices is the conventional (mechanical) mouse, used in conjunction with a cooperating mouse pad. Mechanical mice typically include a rubber-surfaced steel ball that rolls over the mouse pad as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse.

In addition to mechanical types of pointing devices, such as a conventional mechanical mouse, optical pointing devices have also been developed. In one form of an optical pointing device, rather than using a moving mechanical element like a ball, relative movement between an imaging surface, such as a finger or a desktop, and an image sensor within the optical pointing device, is optically sensed and converted into movement information.

Electronic image sensors, such as those typically used in optical pointing devices, are predominantly of two types: CCDs (Charge Coupled Devices) and CMOS—APS (Complimentary Metal Oxide Semiconductor—Active Pixel Sensors). Both types of sensors typically contain an array of photodetectors (e.g., pixels), arranged in a pattern. Each individual photodetector operates to output a signal with a magnitude that is proportional to the intensity of light incident on the site of the photodetector. These output signals can then be subsequently processed and manipulated to generate an image that includes a plurality of individual picture elements (pixels), wherein each pixel in the image corresponds with one of the photodetectors in the image sensor.

Despite advances in the manufacturing process, digital image sensors often contain a few defective pixels as a result of noise or fabrication errors, such as impurity contamination. Defective pixels respond inappropriately to the incident light, and therefore produce inaccurate sensor values. Defective pixels are predominantly of three types: stuck high, stuck low, or abnormal sensitivity. A stuck high pixel has a very high or near to full scale output, while a stuck low pixel has a very low or near to zero output. An abnormal sensitivity pixel produces a sensor value different from neighboring pixels by more than a certain amount when exposed to the same light conditions.

If the image sensor of an optical pointing device contains defective pixels, such as stuck high or stuck low pixels, the values from these pixels may never change, which biases the navigation computation and can cause errors. The values from abnormal sensitivity pixels may change, but such pixels do not perform as expected and can also cause errors. The bad pixels can be caused by one or more of the following: (1) defects in the silicon; (2) external contamination (e.g., particles, fibers, "flash," etc., landing on the array); and (3) improper illumination (e.g., the illumination spot can be de-centered such that part of the array is too "dark"). "Flash" is mold compound that sticks out from a molded piece and that can come loose from the molded piece during production or during use by a customer, and cause particle contamination of the array.

Various defective pixel identification methods have been used in some digital cameras. In these digital cameras, a defective pixel is typically identified by examining the difference between responses of the defective pixel and its immediate pixel neighbors to the same illumination. Once identified, the pixel value of a defective pixel is typically replaced with an estimated value from pixels in the neighborhood of the defective pixel. The process of detecting and correcting defective pixels is referred to as bad pixel correction (BPC).

Existing BPC techniques, such as those used for digital cameras, do not address defects caused by a misaligned illumination source. Digital cameras rely on ambient light to capture images. In contrast, optical pointing devices typically include a light source that is carefully aligned to provide the desired illumination. If the light path becomes offset from the desired alignment, either during production or during use by a customer, a portion of the photodetector array may not receive adequate illumination. The pixels that do not receive adequate illumination may be considered defective pixels. In addition to not addressing such illumination problems, existing BPC techniques typically replace bad pixel values with "good" values computed from neighboring pixels, rather than excluding a bad pixel from subsequent computations.

SUMMARY OF THE INVENTION

One form of the present invention provides an apparatus for controlling the position of a screen pointer. The apparatus includes a light source for illuminating an imaging surface, thereby generating reflected images. The apparatus includes a navigation sensor for generating digital images based on the reflected images, detecting defective pixel locations in the digital images, and generating movement data based on the digital images that is indicative of relative motion between the imaging surface and the apparatus.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
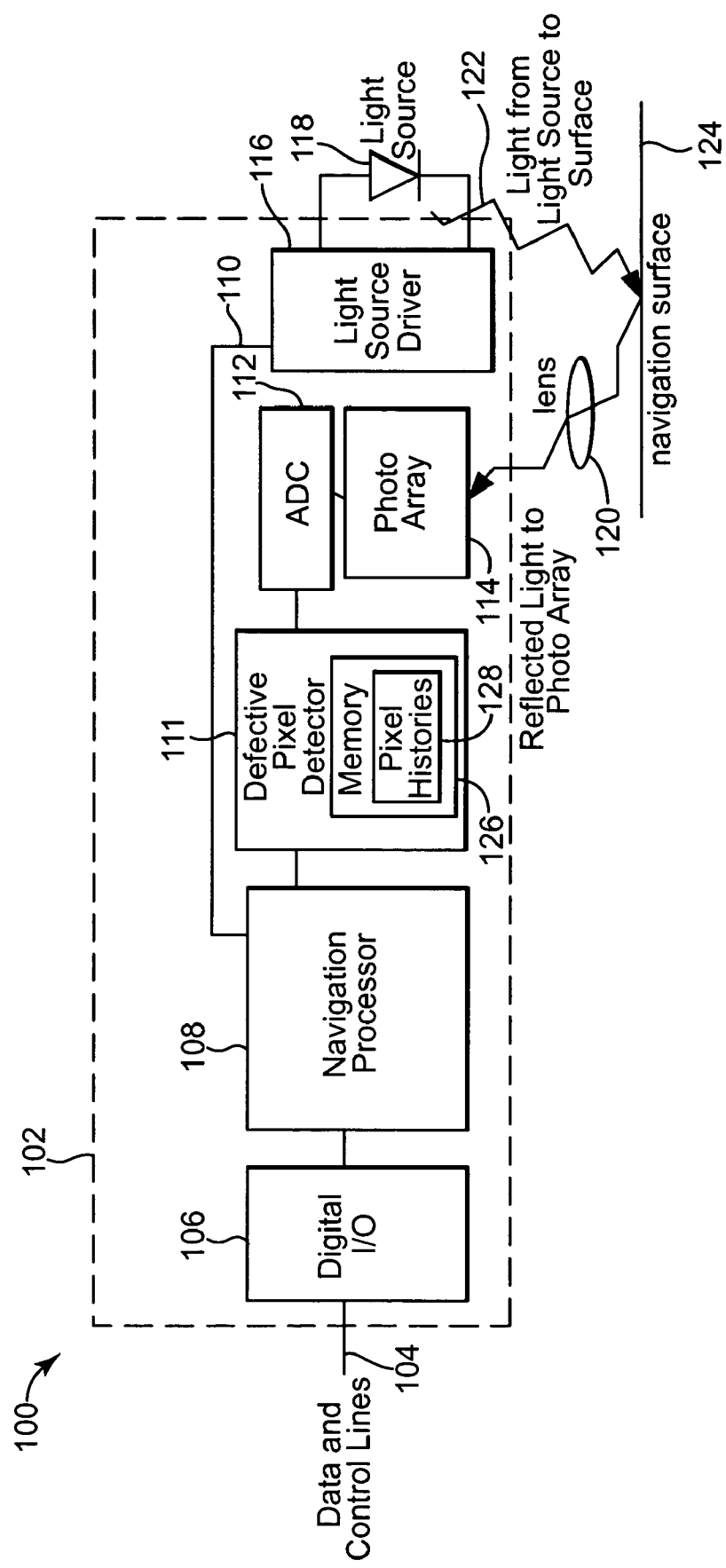
FIG. 1 is a block diagram illustrating major components of an optical pointing device according to one embodiment of the present invention.

FIG. 1 is a block diagram illustrating major components of an optical pointing device 100 according to one embodiment of the present invention. Optical pointing device 100 includes optical navigation sensor integrated circuit (IC) 102, light source 118, and lens 120. Optical navigation sensor 102 includes digital input/output circuitry 106, navigation processor 108, defective pixel detector 111, analog to digital converter (ADC) 112, photodetector array (photo array) 114, and light source driver circuit 116. In one embodiment, optical pointing device 100 is an optical mouse for a desktop personal computer, workstation, portable computer, or other device. In another embodiment, optical pointing device 100 is configured as an optical fingerprint sensing pointing device, or other pointing device.

In operation, according to one embodiment, light source 118 emits light 122 onto navigation surface 124, which is a desktop or other suitable imaging surface, and reflected images are generated. In one embodiment, light source 118 includes one or more LED's. In another embodiment, another type of light source is used for light source 118, such as a laser or other light source. Light source 118 is controlled by driver circuit 116, which is controlled by navigation processor 108 via control line 110. In one embodiment, control line 110 is used by navigation processor 108 to cause driver circuit 116 to be powered on and off, and correspondingly cause light source 118 to be powered on and off.

Reflected light from surface 124 is directed by lens 120 onto photodetector array 114. Each photodetector in photodetector array 114 provides a signal that varies in magnitude based upon the intensity of light incident on the photodetector. The signals from photodetector array 114 are output to analog to digital converter 112, which converts the signals into digital values of a suitable resolution (e.g., eight bits). The digital values represent a digital image or digital representation of the portion of the desktop or other navigation surface under optical pointing device 100.

The digital values generated by analog to digital converter 112 are output to defective pixel detector 111. In one embodiment, defective pixel detector 111 identifies defective pixels in the received digital images, and outputs digital image data with only "good" (i.e., non-defective) pixels to navigation processor 108. A defective pixel is defined to include an aberrant or inoperative pixel, such as a pixel that exhibits only an "ON" or an "OFF" state, a pixel that produces less intensity or more intensity than desired, or a pixel with inconsistent or random operation. The good digital values output by defective pixel detector 111 are stored as frames within navigation processor 108.

The overall size of photodetector array 114 is preferably large enough to receive an image having several features. Images of such spatial features produce translated patterns of pixel information as optical pointing device 100 moves over navigation surface 124. The number of photodetectors in array 114 and the frame rate at which their contents are captured and digitized cooperate to influence how fast optical pointing device 100 can be moved across a surface and still be tracked. Tracking is accomplished by navigation processor 108 by comparing a newly captured sample frame with a previously captured reference frame to ascertain the direction and amount of movement.

In one embodiment, navigation processor 108 correlates sequential frames to determine motion information. In one form of the invention, the entire content of one of the frames is shifted by navigation processor 108 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted by navigation processor 108 on a pixel by pixel basis, and the resulting differences are preferably squared and then summed to form a measure of similarity (correlation) within that region of overlap. In another embodiment, larger trial shifts (e.g., two over and one down) may be used. The trial shift with the least difference (greatest correlation) can be taken as an indication of the motion between the two frames. That is, it provides raw movement information that may be scaled and or accumulated to provide movement information ($\Delta X$ and $\Delta Y$) of a convenient granularity and at a suitable rate of information exchange, which is output to a host device by digital input/output circuitry 106 on data and control lines 104. Optical pointing device 100 is also configured to receive data and control signals from a host device via data and control lines 104.

In one embodiment, defective pixel detector 111 includes a memory 126 for storing an adaptive pixel history 128 for each of the pixels in photo array 114. In one form of the invention, the adaptive history 128 includes, for each pixel, the time since the last change in value of the pixel. In one embodiment, pixels that have not changed in value for a threshold period of time are identified by detector 111 as being defective, and are not used in the navigation computation by navigation processor 108, effectively removing the defective pixels from the correlation. This embodiment is described in further detail below with reference to FIG. 2.

Figure 2:
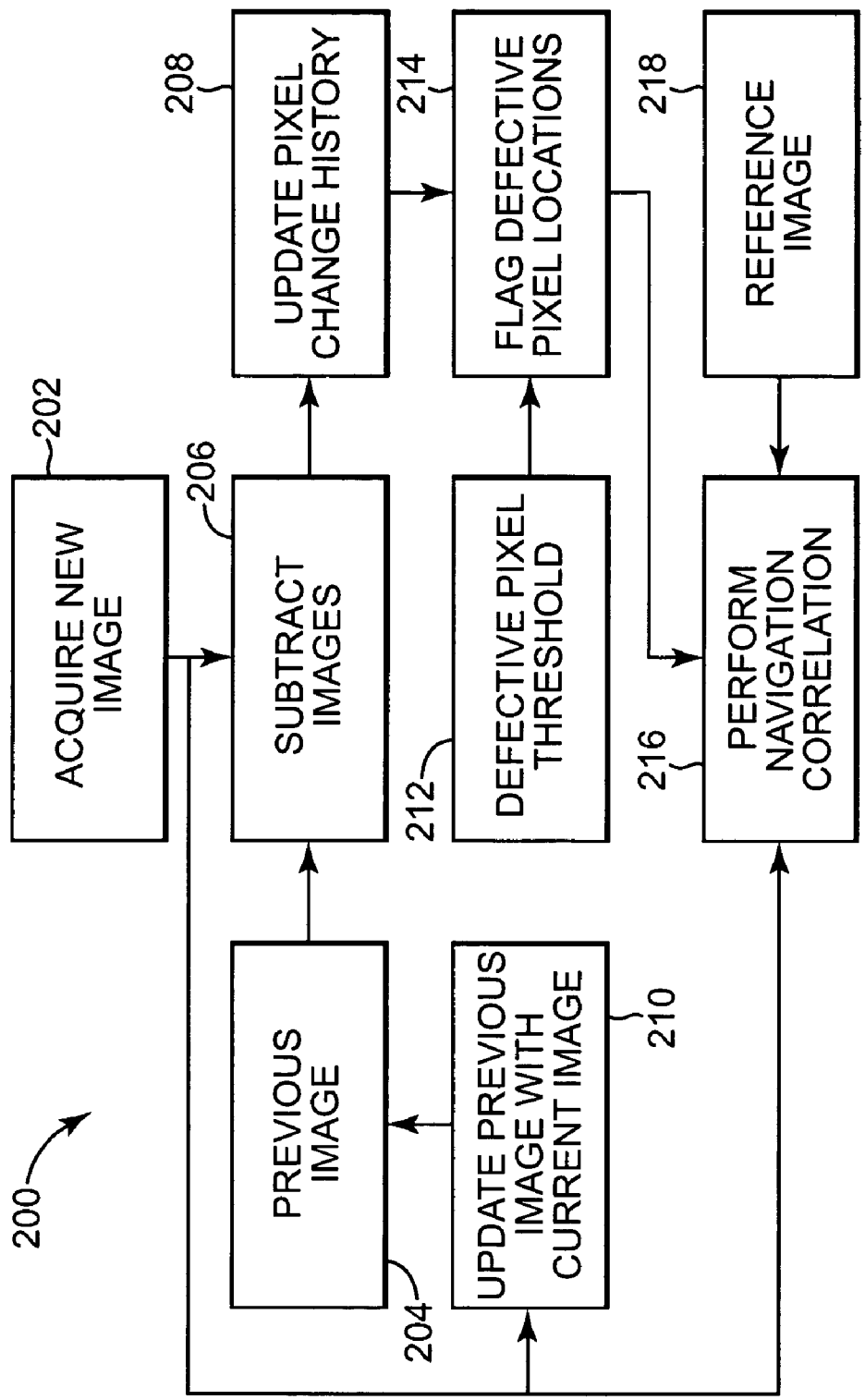
FIG. 2 is a flow diagram illustrating a method for generating movement data with the optical pointing device shown in FIG. 1 using a fixed threshold for detecting defective pixels according to one embodiment of the present invention.

FIG. 2 is a flow diagram illustrating a method 200 for generating movement data with optical pointing device 100 using a fixed threshold for detecting defective pixels according to one embodiment of the present invention. In step 202, a new image is acquired by photo array 114. The acquired image is converted into a current digital image by analog to digital converter 112, and the current digital image is output to defective pixel detector 111. In step 206, defective pixel detector 111 subtracts the current digital image and a previously acquired digital image (represented by block 204), and thereby generates a delta value for each pixel location in the images. The delta value indicates the amount of change of the pixel value between the two images. In step 208, defective pixel detector 111 updates the adaptive pixel history 128 (also referred to as the pixel change history 128) for each pixel location based on the delta values calculated in step 206. In one embodiment, defective pixel detector 111 stores, for each pixel location, the time since the last change in value of the pixel, in memory 126.

In step 214, defective pixel detector 111 flags defective pixel locations. In one embodiment, defective pixel detector 111 identifies defective pixel locations by comparing the adaptive pixel history 128 (updated in step 208) with a defective pixel threshold (represented by block 212). In one form of the invention, pixels that have not changed in value for a threshold period of time (indicated by the defective pixel threshold 212), are identified as being defective by defective pixel detector 111, and the identified defective pixel locations are flagged. An appropriate value for the defective pixel threshold 212 is set, taking into account that there may be long periods of time when the optical pointing device 100 is not being moved (e.g., for an office use model, the device 100 may not be used much during the evening, weekends, vacations, etc.), and the pixel values are not expected to change during these times.

In step 216, navigation processor 108 performs a navigation correlation. In one embodiment, navigation processor 108 correlates the current digital image (acquired in step 202) with a previously acquired digital image (which is indicated by reference image block 218) to determine an amount and direction of movement between the two images. In one embodiment, the reference image 218 is the same as the previous image 204. In one form of the invention, pixel locations that are identified by detector 111 as being defective in step 214 are not used by navigation processor 108 in the correlation in step 216.

In step 210, the current digital image (acquired in step 202) replaces the previous digital image 204 and becomes the previous digital image 204 and the reference image 218 for the next iteration of method 200. Another new image is then acquired in step 202, and the method 200 is repeated. Any desired number of iterations of method 200 may be performed.

In one embodiment, an appropriate value for the defective pixel threshold 212 is determined by monitoring individual pixel value changes versus changes in the average value for the whole photo array 114, or changes in an average value for a pixel's local neighbors. In this embodiment, the defective pixel threshold is adaptive, and depends on the behavior of the aggregate array 114 or a subset of the array 114. One embodiment of a method that uses an adaptive defective pixel threshold is described in further detail below with reference to FIG. 3.

Figure 3:
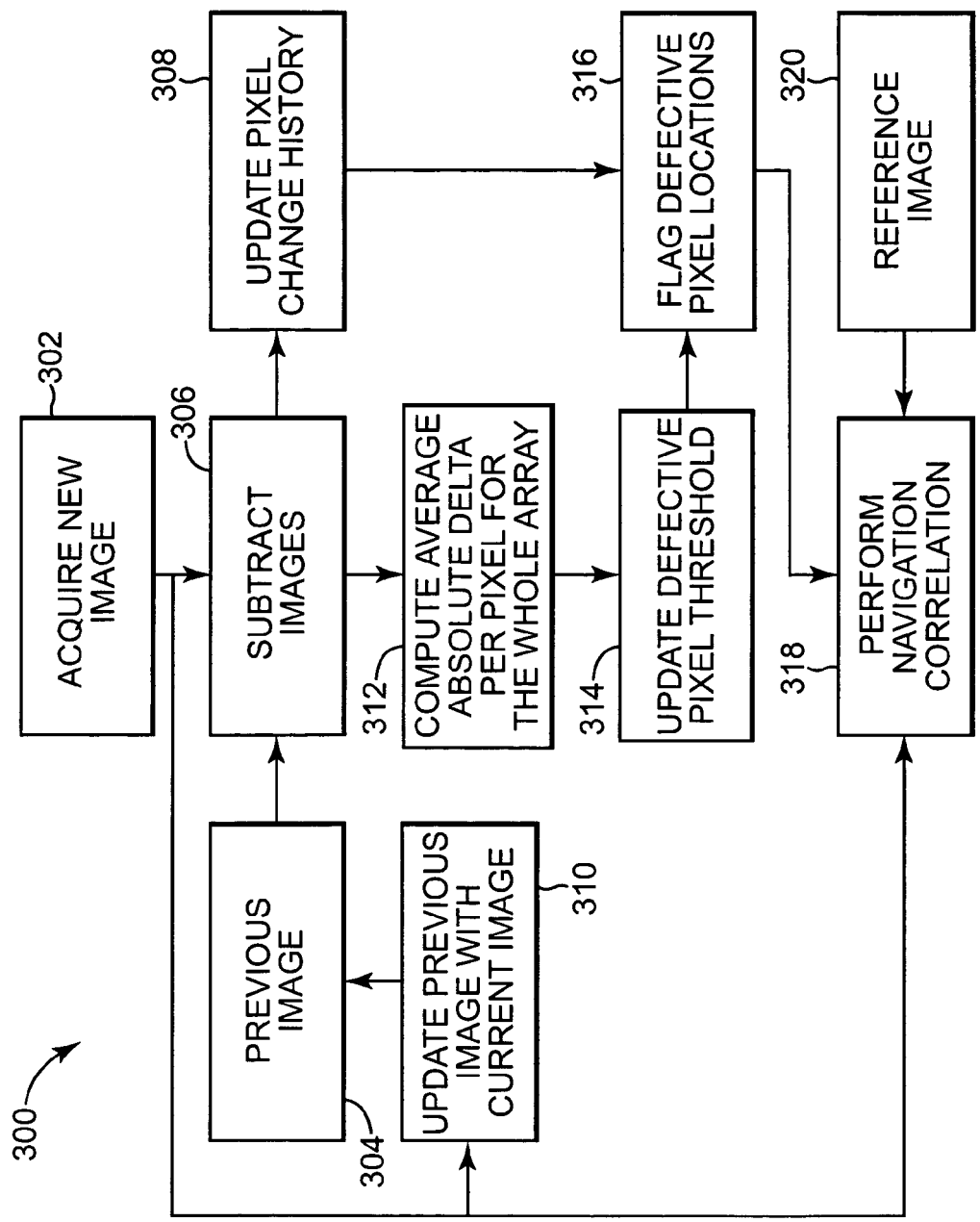
FIG. 3 is a flow diagram illustrating a method for generating movement data with the optical pointing device shown in FIG. 1 using an adaptive threshold for detecting defective pixels according to one embodiment of the present invention.

FIG. 3 is a flow diagram illustrating a method 300 for generating movement data with optical pointing device 100 using an adaptive threshold for detecting defective pixels according to one embodiment of the present invention. In step 302, a new image is acquired by photo array 114. The acquired image is converted into a current digital image by analog to digital converter 112, and the current digital image is output to defective pixel detector 111. In step 306, defective pixel detector 111 subtracts the current digital image and a previously acquired digital image (represented by block 304), and thereby generates a delta value for each pixel location in the images. The delta value indicates the amount of change of the pixel value between the two images. In step 308, defective pixel detector 111 updates the pixel change history 128 for each pixel location based on the delta values calculated in step 306. In one embodiment, defective pixel detector 111 stores, for each pixel location, the time since the last change in value of the pixel, in memory 126.

In step 312, defective pixel detector 111 computes an absolute value of each of the delta values determined in step 306, and computes an average of all of these absolute values. The result from the computation in step 312 is referred to herein as the average absolute delta. In step 314, defective pixel detector 111 updates a defective pixel threshold based on the average absolute delta value computed in step 312. In one embodiment, if there has not been much of a change between the previous image 304 and the current image (acquired in step 302), the average absolute delta computed in step 312 will be a relatively low value, and defective pixel detector 111 will increase the defective pixel threshold in step 314. Thus, if the optical pointing device 100 is not being used, there will not be much change, if any, between successive digital images, and the defective pixel threshold will become relatively high so that very few, if any, pixels will be identified as being defective. In one form of the invention, if there has been a large amount of change between the previous image 304 and the current image (acquired in step 302), the average absolute delta computed in step 312 will be a relatively high value, and defective pixel detector 111 will decrease the defective pixel threshold in step 314.

In step 316, defective pixel detector 111 flags defective pixel locations. In one embodiment, defective pixel detector 111 identifies defective pixel locations by comparing the adaptive pixel history 128 (updated in step 308) with the defective pixel threshold (updated in step 314). In one form of the invention, pixels that have not changed in value for a threshold period of time (indicated by the defective pixel threshold), are identified as being defective by defective pixel detector 111, and the identified defective pixel locations are flagged.

In step 318, navigation processor 108 performs a navigation correlation. In one embodiment, navigation processor 108 correlates the current digital image (acquired in step 302) with a previously acquired digital image (which is indicated by reference image block 320) to determine an amount and direction of movement between the two images. In one embodiment, the reference image 320 is the same as the previous image 304. In one form of the invention, pixel locations that are identified by detector 111 as being defective in step 316 are not used by navigation processor 108 in the correlation in step 318.

In step 310, the current digital image (acquired in step 302) replaces the previous digital image 304 and becomes the previous digital image 304 and the reference image 320 for the next iteration of method 300. Another new image is then acquired in step 302, and the method 300 is repeated. Any desired number of iterations of method 300 may be performed.

Noise is typically an issue with digital image sensors. One form of the present invention provides a method of identifying defective pixels that is robust to noise. A noise-tolerant method according to one embodiment of the invention maintains an adaptive history for each pixel by recursively updating a "smooth" frame, S, based on each captured digital image (referred to as an input frame, I). A smooth frame according to one form of the invention is a frame that changes relatively slowly compared to the changes that occur in successive input frames. The smooth frame according to one embodiment represents an average of past frames. In another embodiment of the invention, rather than using a smooth frame, a number of past frames are stored, and an average value is calculated from the stored frames. One embodiment of a method that updates a smooth frame is described in further detail below with reference to FIG. 4.

Figure 4:
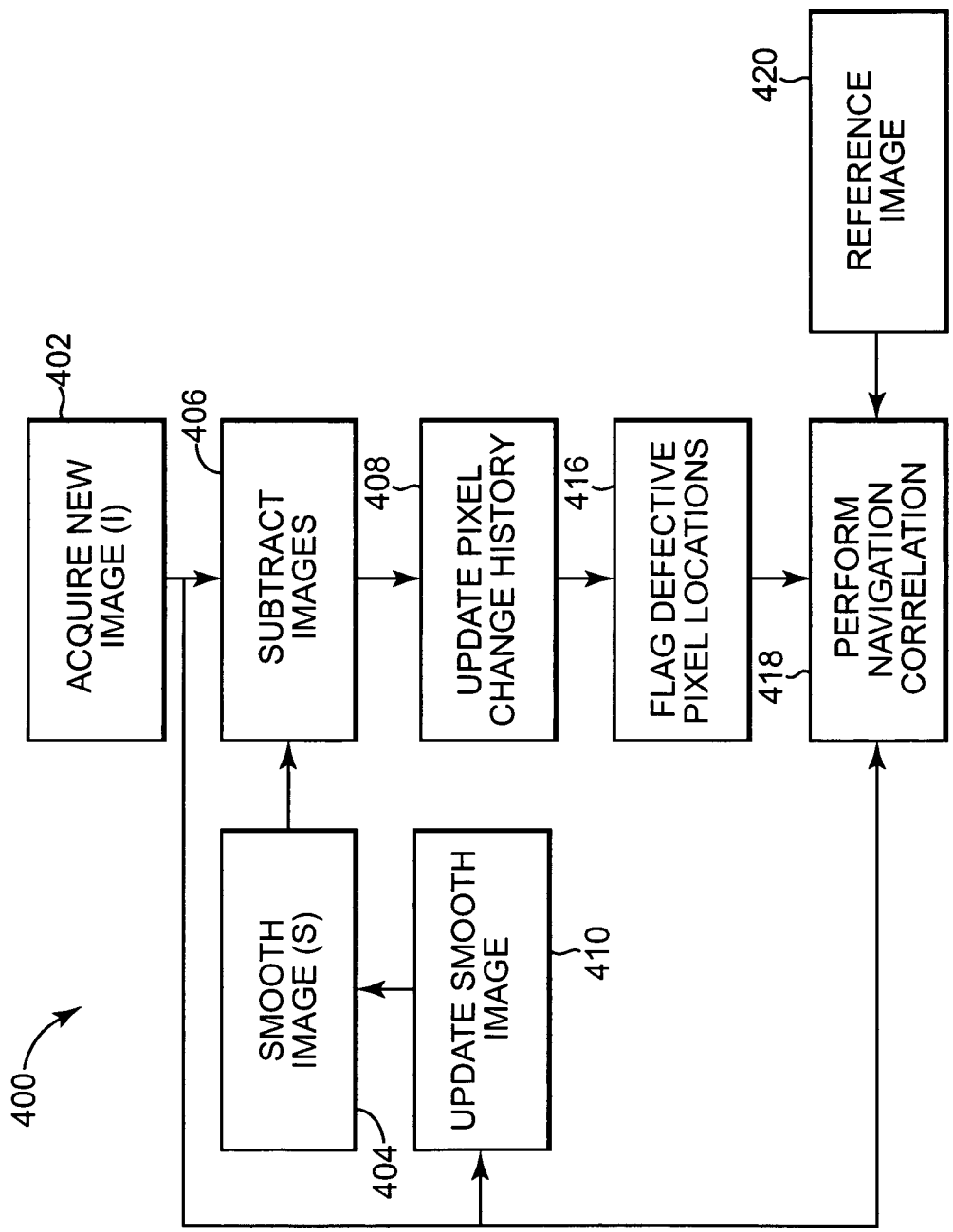
FIG. 4 is a flow diagram illustrating a method for generating movement data with the optical pointing device shown in FIG. 1 using a smooth frame for detecting defective pixels according to one embodiment of the present invention.

FIG. 4 is a flow diagram illustrating a method 400 for generating movement data with optical pointing device 100 using a smooth frame for detecting defective pixels according to one embodiment of the present invention. In step 402, a new image is acquired by photo array 114. The acquired image is converted into a current digital image by analog to digital converter 112, and the current digital image is output to defective pixel detector 111. The current digital image acquired in step 402 is also referred to as an input image or input frame, I.

A smooth image or smooth frame, S, is represented by block 404. In step 410, defective pixel detector 111 updates the smooth frame (S) 404 based on the current digital image acquired in step 402. In one embodiment, defective pixel detector 111 updates the smooth frame (S) 404 based on the following Equation I:

$$S = a*S + (1-a)*I.$$ Equation I

Where:

S=smooth frame 404;

a=constant value; and

I=input frame acquired in step 402.

In one embodiment, the pixel values of the smooth frame (S) 404 are stored in memory 126 within defective pixel detector 111. For values of the constant, a, near 1.0, the smooth frame (S) 404 changes slowly with each input frame, I, and therefore does not respond to small noise fluctuations. In one form of the invention, a value of 0.75 is used for the constant, a, in Equation I. In other embodiments, other values for the constant, a, are used.

In step 406, defective pixel detector 111 subtracts the current digital image (acquired in step 402) and the smooth frame 404 (updated in step 410), and thereby generates a delta value for each pixel location in the images. The delta value indicates the amount of change of the pixel value between the two images. In step 408, defective pixel detector 111 updates the pixel change history 128 for each pixel location based on the delta values calculated in step 406. In one embodiment, as part of the updating in step 408, defective pixel detector 111 determines whether the absolute value of each of the delta values computed in step 406 is less than a threshold value, T. In one embodiment, a value of "32" is used for the threshold, T, which is one-eighth of the full-scale reading of the analog to digital converter 112. In other embodiments, other values are used for the threshold, T. In one form of the invention, defective pixel detector 111 maintains a set of counters, one for each pixel in array 114. If the delta value computed in step 406 for a given pixel is less than the threshold value, T, the counter for that pixel is incremented. If the delta value computed in step 406 for a given pixel is greater than or equal to the threshold value, T, the counter for that pixel is reset to zero. Thus, in one embodiment, the pixel change history 128 includes a set of counters that keep track of how many consecutive frames that each pixel in an input frame, I, falls within the threshold value, T, of a corresponding pixel in the smooth frame, S.

In one embodiment, the value of the threshold, T, is set based on what mode the optical pointing device 100 is in (e.g., the value of the threshold is set higher in a "run" mode where motion is actively being computed, than in a "rest" mode where the user is not using the device 100 and the device 100 is not actively computing motion).

In step 416, defective pixel detector 111 flags defective pixel locations. In one embodiment, if the intensity of any pixel in the input frame, I, (acquired in step 402), is less than the threshold, T, in absolute value from a corresponding pixel in the smooth frame, S, (updated in step 404), for N consecutive frames, then defective pixel detector 111 identifies the pixel as being defective. In one form of the invention, if a pixel's change in value from the smooth frame, S, exceeds the threshold, T, in any frame of the N consecutive frames, the pixel is deemed by defective pixel detector 111 to be active (or "good"). In one embodiment, the variable N represents an integer that is greater than one. In one embodiment, a value of "10" is used for the variable N. In other embodiments, other values are used for the variable N. In one form of the invention, defective pixel detector 111 uses the counters (updated in step 408 and described above) to identify defective pixel locations. If the counter value for a given pixel location is greater than or equal to N, the pixel is identified as being defective. If the counter value for a given pixel is less than N, the pixel is deemed to be active (or "good").

In step 418, navigation processor 108 performs a navigation correlation. In one embodiment, navigation processor 108 correlates the current digital image (acquired in step 402) with a previously acquired digital image (which is indicated by reference image block 420) to determine an amount and direction of movement between the two images. In one form of the invention, pixel locations that are identified by detector 111 as being defective in step 416 are not used by navigation processor 108 in the correlation in step 418.

After the first iteration of method 400, the current digital image (acquired in step 402) replaces the reference image 420 and becomes the reference image 420 for the next iteration of method 400. Another new image is then acquired in step 402, and the method 400 is repeated. Any desired number of iterations of method 400 may be performed.

In one form of the invention, in addition to checking for changes in value of pixels and comparing changes to threshold values as described above, defective pixel detector 111 also checks additional conditions before identifying a pixel as being defective. In one embodiment, one such additional condition is that the pixel value itself is consistently low (e.g., less than a given minimum threshold value, $T_L$, for N consecutive frames). In one embodiment, the minimum threshold value, $T_L$, is one-eighth of the full-scale reading of the analog to digital converter 112 (e.g., $T_L=32$). This additional condition helps to make sure that the exclusion of pixels in the navigation computation only applies to consistently dark pixels (e.g., insufficiently illuminated) and not to bright pixels. In another form of the invention, an additional condition that is applied is that the pixel value itself is consistently high (e.g., greater than a given maximum threshold value, $T_H$, for N consecutive frames). In one embodiment, the maximum threshold value, $T_H$, is seven-eighths of the full-scale reading of the analog to digital converter 112 (e.g., $T_H=224$). This additional condition helps to make sure that the exclusion of pixels in the navigation computation only applies to consistently bright pixels and not to dark pixels. In another form of the invention, both a minimum threshold, $T_L$, and a maximum threshold, $T_H$, are used, so that both consistently bright pixels and consistently dark pixels may be removed from subsequent navigation computations.

A method for detecting defective pixels according to one form of the invention works two ways: (1) pixels that are bad or go bad over time are removed from the navigation computation by defective pixel detector 111; and (2) bad pixels that come back to life are reinstated back into the navigation computation by defective pixel detector 111.

In one embodiment, defective pixel detector 111 is implemented with digital logic and circuitry. It will be understood by a person of ordinary skill in the art that functions performed by optical pointing device 100, including defective pixel detector 111, may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Embodiments of the present invention provide several advantages over prior art optical pointing devices. Previous optical pointing devices have not used bad pixel detection techniques. Unlike digital cameras, navigation sensors do not produce an image for humans to see, and therefore can simply omit bad pixels from further computation as described above, instead of "filling them in" as has been done with some existing digital cameras. With one form of the present invention, yield is improved as image sensors with bad pixels do not have to be rejected. Also, issues that arise in the field (e.g., after production and testing) are addressed by embodiments of the present invention. For example, if a mechanical shock to optical pointing device 100 in the field causes additional particle contamination or changes in the illumination spot position, the adaptive method according to one form of the invention can compensate for such problems.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus for controlling a position of a screen pointer, the apparatus comprising:
    a light source for illuminating an imaging surface, thereby generating reflected images; and
    a navigation sensor for generating digital images based on the reflected images, detecting defective pixel locations in the digital images, and generating movement data based on the digital images that is indicative of relative motion between the imaging surface and the apparatus, the navigation sensor being configured to maintain an adaptive history for each pixel location in the digital images,
    wherein the adaptive history comprises a smooth frame that is updated based on pixel values of each of the generated digital images, and that changes relatively slowly compared to changes between successive ones of the digital images, the smooth frame including pixel locations that correspond to pixel locations of each of the generated digital images, and
    wherein the navigation sensor is configured to identify a pixel location as being a defective pixel location if an absolute value of a difference between a value of a pixel at the location in the digital images and a value of a corresponding pixel in the smooth frame is less than a threshold value for N consecutive digital images, where N represents an integer greater than one.

2. The apparatus of claim 1, wherein the navigation sensor is configured to flag pixel locations that are detected as being defective.

3. The apparatus of claim 1, wherein the navigation sensor is configured to generate the movement data based on a correlation of good pixels from the digital images and not based on pixels in the detected defective pixel locations.

4. The apparatus of claim 1, wherein the navigation sensor is configured to identify a pixel location as being defective only if values of pixels at the location are consistently below a minimum threshold value.

5. The apparatus of claim 1, wherein the navigation sensor is configured to identify a pixel location as being defective only if values of pixels at the location are consistently above a maximum threshold value.

6. The apparatus of claim 1, wherein the navigation sensor is configured to set the threshold value based on a current mode of operation of the navigation sensor.

7. The apparatus of claim 1, wherein the navigation sensor is configured to determine whether previously detected defective pixel locations have subsequently become good pixel locations.

8. A method of identifying defective pixels in a pixel array of an optical pointing device, the method comprising:
    generating a plurality of digital images based on outputs of the pixel array;
    maintaining an adaptive history for each pixel location in the digital images; and
    identifying defective pixels in the pixel array by a digital logic and circuitry of the optical pointing device based on a comparison of the adaptive history and a threshold value,
    wherein the adaptive history comprises a smooth frame that is updated based on pixel values of each of the generated digital images, and that changes relatively slowly compared to changes between successive ones of the digital images, the smooth frame including pixel locations that correspond to pixel locations of each of the generated digital images, and
    wherein the smooth frame is calculated based on an equation, $S=a*S+(1-a)*I$, where "S" represents the smooth frame, "a" represents a constant value, and "I" represents a current one of the generated digital images.

9. The method of claim 8, and further comprising:
    flagging defective pixels locations so that defective pixels at the flagged locations are not used by the optical pointing device in determining movement information.

10. An apparatus for controlling a position of a screen pointer, the apparatus comprising:
    a light source for illuminating an imaging surface, thereby generating reflected images; and
    a navigation sensor for generating digital images based on the reflected images, detecting defective pixel locations in the digital images, and generating movement data based on the digital images that is indicative of relative motion between the imaging surface and the apparatus, the navigation sensor being configured to maintain an adaptive history for each pixel location in the digital images,
    wherein the adaptive history comprises a smooth frame that is updated based on pixel values of each of the generated digital images, and that changes relatively slowly compared to changes between successive ones of the digital images, the smooth frame including pixel locations that correspond to pixel locations of each of the generated digital images, and
    wherein the smooth frame is calculated based on an equation, $S=a*S+(1-a)*I$, where "S" represents the smooth frame, "a" represents a constant value, and "I" represents a current one of the generated digital images.

11. A method of identifying defective pixels in a pixel array of an optical pointing device, the method comprising:
    generating a plurality of digital images based on outputs of the pixel array;

maintaining an adaptive history for each pixel location in the digital images; and identifying defective pixels in the pixel array by a digital logic and circuitry of the optical pointing device based on a comparison of the adaptive history and a threshold value, wherein the adaptive history comprises a smooth frame that is updated based on pixel values of each of the generated digital images, and that changes relatively slowly compared to changes between successive ones of the digital images, the smooth frame including pixel locations that correspond to pixel locations of each of the generated digital images, and wherein the identifying the defective pixels includes identifying a pixel location as being a defective pixel location if an absolute value of a difference between a value of a pixel at the location in the digital images and a value of a corresponding pixel in the smooth frame is less than a threshold value for N consecutive digital images, where N represents an integer greater than one.

* * * * *